(12) United States Patent
Oetken

(10) Patent No.: US 10,696,324 B2
(45) Date of Patent: Jun. 30, 2020

(54) CONTROLLING MACHINE OPERATION INCLUDING MACHINE TURNING RADIUS

(71) Applicant: Caterpillar Paving Products Inc., Brooklyn Park, MN (US)

(72) Inventor: Nicholas A. Oetken, Brooklyn Park, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/160,402

(22) Filed: Oct. 15, 2018

(65) Prior Publication Data
US 2020/0114962 A1    Apr. 16, 2020

(51) Int. Cl.
| | |
|---|---|
| B62D 6/02 | (2006.01) |
| E01C 19/26 | (2006.01) |
| E02D 3/02 | (2006.01) |
| B60W 10/18 | (2012.01) |
| B60W 10/20 | (2006.01) |
| B62D 6/00 | (2006.01) |
| B60W 30/18 | (2012.01) |
| B60W 10/04 | (2006.01) |

(52) U.S. Cl.
CPC ............... *B62D 6/02* (2013.01); *B60W 10/04* (2013.01); *B60W 10/18* (2013.01); *B60W 10/20* (2013.01); *B60W 30/18145* (2013.01); *B62D 6/001* (2013.01); *E01C 19/26* (2013.01); *E02D 3/02* (2013.01); *B60W 2520/10* (2013.01)

(58) Field of Classification Search
CPC . B62D 6/00; B62D 6/02; B60W 10/04; E02D 3/02; E01C 19/26

USPC .......................................................... 701/41
See application file for complete search history.

(56) References Cited

U.S. PATENT DOCUMENTS

| | | | |
|---|---|---|---|
| 5,489,006 A | * | 2/1996 | Saiia .................. B62D 5/12 180/421 |
| 7,810,887 B2 | | 10/2010 | Hjerth et al. |
| 8,019,514 B2 | | 9/2011 | Yuet et al. |
| 8,818,699 B2 | | 8/2014 | Nichols et al. |
| 9,550,522 B2 | | 1/2017 | Oetken et al. |
| 9,952,115 B2 | | 4/2018 | Landes et al. |

(Continued)

FOREIGN PATENT DOCUMENTS

CN      103675320      8/2015

*Primary Examiner* — Isaac G Smith

(74) *Attorney, Agent, or Firm* — Schwegman, Lundberg & Woessner

(57) ABSTRACT

According to one example, a control system is disclosed. The system can include a steering system configured to direct a movement of a compactor within a compacting area. The system can include one or more sensors configured to generate data indicative of operational criteria of the compactor, the one or more sensors including a speed sensor configured to measure a speed of the compactor over a surface within the compacting area and a controller communicatively coupled to the one or more sensors. The controller can be configured to: receive data indicative of the speed of the compactor from the speed sensor, determine if the speed of the compactor exceeds a first threshold speed, and if the speed of the compactor exceeds the first threshold speed, control the steering system to limit a turning angle to a predetermined value such that a turning radius of the compactor is increased.

17 Claims, 5 Drawing Sheets

(56) References Cited

U.S. PATENT DOCUMENTS

2006/0034660 A1\* 2/2006 Satzler .................. E01C 19/236
                                                    404/124
2019/0133023 A1\* 5/2019 Iwami ...................... B62D 6/02

\* cited by examiner

CONTROLLING MACHINE OPERATION INCLUDING MACHINE TURNING RADIUS

TECHNICAL FIELD

The present application relates to working vehicles, in particular, compactors.

BACKGROUND

Compactors have been developed for soil compaction as well as asphalt compaction. The present application is applicable to both such contexts and is applicable to all compactors.

In a paving context, a paving machine distributes hot paving material over a surface such as a road or parking lot. One or more compactors follow the paving machine to compact the material to a desired density and obtain an acceptable surface finish. Most commonly; the compacting process is performed with double drum compactors and pneumatic tire compactors. Double drum compactors, having a front drum and a back drum, which serve to propel the machine and compact the asphalt to a suitable state via the weight of the compactor and in some instances a vibratory eccentric weight within the drum. Pneumatic tire compactors, having a front set of tires and a rear set of tires, which serve to propel machine and compact the asphalt to a suitable state via the weight of the compactor. Completing compaction can often require multiple passes across the asphalt mat with a compactor.

Compaction of a construction material is recognized as being important for improving the stability of the material in construction operations such as soils and asphalt pavement. By compacting the surface, soil strength and stability can be increased to the magnitude required by the design. State Highway Agencies and contractors are concerned about quality control of the quality and/or extent of compaction of various types of terrains.

SUMMARY

In an example, a system for control of a movement of a compactor within a compacting area is disclosed. The system can include a brake system, a drive system and a steering system configured to direct the movement of the compactor. The system can include one or more sensors configured to generate data indicative of operational criteria of the compactor, the one or more sensors including a speed sensor configured to measure a speed of the compactor over a surface within the compacting area and a controller communicatively coupled to the one or more sensors. The controller can be configured to: receive data indicative of the speed of the compactor from the speed sensor, determine if the speed of the compactor exceeds a first threshold speed, and if the speed of the compactor exceeds the first threshold speed, control the steering system to limit a turning angle to a predetermined value such that a turning radius of the compactor is increased.

According to another example, a compactor is disclosed and can comprise a steering system configured to direct the movement of the compactor, one or more sensors on the compactor configured to generate data indicative of operational criteria of the compactor, the one or more sensors including a speed sensor configured to measure a speed of the compactor over a surface within the compacting area, and a controller coupled to the machine and communicatively coupled to the one or more sensors. The controller can be configured to: receive data indicative of the speed of the compactor from the speed sensor, determine if the speed of the compactor exceeds a first threshold speed, and if the speed of the compactor exceeds the first threshold speed, control the steering system to limit a turning angle to a predetermined value such that a turning radius of the compactor is increased.

According to a further example, a method for control of a movement of a compactor within a compacting area is disclosed. The method can comprise directing the movement the compactor with a steering system, sensing one or more operational criteria of the compactor including a speed of the compactor over a surface within the compacting area, determining if the speed of the compactor exceeds a threshold speed, and controlling the steering system to limit a turning angle to a predetermined value if the speed of the compactor exceeds the threshold speed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

In FIG. 3A, a first turn is depicted that is tighter than that of FIG. 3B, and therefore, has a relatively lower turning radius than that of FIG. 3B. FIG. 3B schematically depicts the compactor performing a second turn that is more gradual having a larger turning radius than that of FIG. 3A.

DETAILED DESCRIPTION

With compactors, turning overly sharply (i.e. with a steering angle of a high degree resulting in a low turning radius) while traveling at an undesirably fast rate of speed while performing compaction can cause damage to a surface of the material (e.g., soil, asphalt, etc.) being compacted. Such damage can be due to the lateral turning forces exerted on the surface by the drum(s). The damage caused looks like excessive tearing and material movement. This damage has a negative impact on quality control, project completion timeframe and other project related aspects.

In view of the foregoing problems, the present application recognizes this type of damage can be due to multiple factors but primarily can be the result of machine operation with an undesirable (excessive) operating speed and with an undesirably high degree of steering angle for that operating speed. Other factors related to such damage are also recognized and can include the properties of the material being compacted (e.g., type, density, modulus and/or temperature of asphalt or soil), slope of the compacting area, compactor mass, machine type (e.g., a width of drum, a type of drum(s), etc.) and material properties or conditions (e.g., moisture content, etc.) of the underlying material layer (e.g., the soil).

Figure 1:
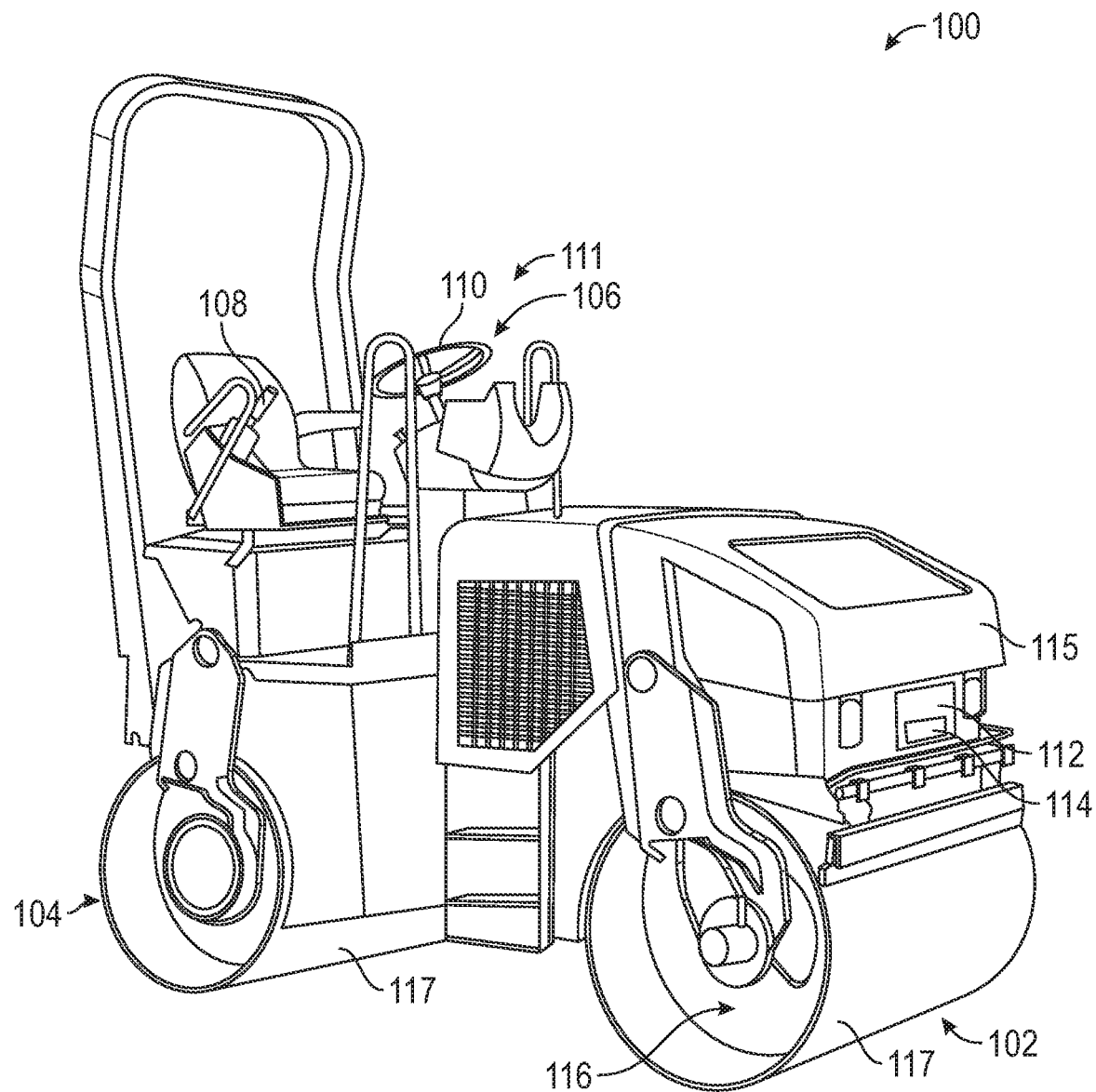
FIG. 1 depicts an example compactor in accordance with this disclosure.

Referring to FIG. 1, a compactor 100 is shown according to one example of the present disclosure. The compactor 100 is illustrated as a self-propelled double drum compactor having a front drum 102 and a back drum 104. However, it should be recognized that the various systems, methods and techniques disclosed herein are applicable to any type of compactor and are not limited to the type shown in FIG. 1.

The compactor 100 includes an operator station 106 which may be equipped with various systems and mechanisms for control of the operating of the compactor 100. The compactor 100 therefore can include a drive system 108 (indicated to include a shift lever), a steering system 110 (indicated to include a steering wheel) and an operational controller 111. The drive system 108 can additionally include an engine 112 and a generator 114 coupled with the engine 112, which can be attached to a frame 115 of the compactor 100. The generator 114 can serve as an electrical power source for various onboard systems and components, including the operational controller 111. The engine 112 can comprise any type of engine (internal combustion, gas, diesel, gaseous fuel, natural gas, propane, etc.), can be of any size, with any number of cylinders, and in any configuration. The engine 112 can be configured to drive movement of the compactor 100 and can also drive other components such as the generator 114. According to some examples, the engine 112 can comprise an electric motor.

Construction of one example of the operational controller 111 will be discussed further in reference to FIG. 4 below. The operational controller 111 can include a processor and a memory component. The processor may be a microprocessor or other processor as known in the art. The operational controller 111 is configured to communicate with and control various systems and components as described herein.

The steering system 110 can include various mechanisms and devices not specifically shown but known in the art. For example, the steering system 110 can include a friction device in communication with the operational controller 111 and configured to create resistance to movement by the operator of the steering wheel. Friction devices are well known in the art and can create resistance mechanically, electrically, by use of a variable viscosity fluid, or the like. Similarly, the steering system 110 can include a steering control valve in communication with the operational controller 111. The steering control valve can be configured to receive processed steering input from the operational controller 111 and, based on that input, to steer the compactor 100 by controlling the angular movement of the drums 102, 104, as is known in the art.

The steering system 110 can be configured to receive operator steering input. As is further discussed herein, the steering system 110 can alternatively or additionally be configured to be controlled automatically by the operational controller 111 in some examples. Thus, the steering system 110 can be communicatively coupled for communication with the operational controller 111. In some examples, the steering system 110 can be configured to transmit the operator steering input to the operational controller 111 for processing.

Similarly, the drive system 108 can be configured to receive operator input such as to increase or decrease a speed of the compactor 100. As is further discussed herein, the drive system 108 can alternatively or additionally be configured to be controlled automatically by the operational controller 111 in some examples. Thus, the drive system 108 can be communicatively coupled for communication with the operational controller 111. In some examples, the drive system 108 can be configured to transmit the operator input to the operational controller 111 for processing.

In yet further examples, the compactor 100 can have a braking system 116 configured to receive operator input to decrease or arrest a speed of the compactor 100. The braking system 116 can alternatively or additionally be configured to be controlled automatically by the operational controller 111 in some examples. Thus, the braking system 116 can be communicatively coupled for communication with the operational controller 111.

As discussed above, it should be appreciated that the compactor 100 is illustrative only and a wide variety of the compactors 100 can be designed and/or controlled in accordance with the present disclosure. For example, rather than a double drum compactor, the compactor 100 might include only a single drum and some other type of compacting element. For instance, the front compacting element might be a drum, and the back compacting element could be a pneumatic compacting element. Compactors with a split drum are also contemplated. Moreover, the compactor 100 might comprise a tow-behind or pushed compacting apparatus. The operator station 106 might also be dispensed with in versions where the compactor 100 is operated in an autonomous fashion and a remote control or self-guidance system is used. As is further discussed herein, the systems, methods and techniques can control of a movement of the compactor 100 within a compacting area.

Specific to the compactor 100 of FIG. 1, each of the front drum 102 and the back drum 104 includes a drum surface 117 for compacting asphalt. The drum surface 117 may consist of a cylindrical, smooth metallic surface comprising the exterior of a shell of the front and bad(drums 102 and 104. As the compactor 100 is passed across an asphalt mat to compact it, the drum surface 117 will roll against a material (i.e. an asphalt mat) laid by a paver (not shown). As a result, the asphalt of the mat will increase in density and develop a relatively smooth surface finish.

Figure 2:
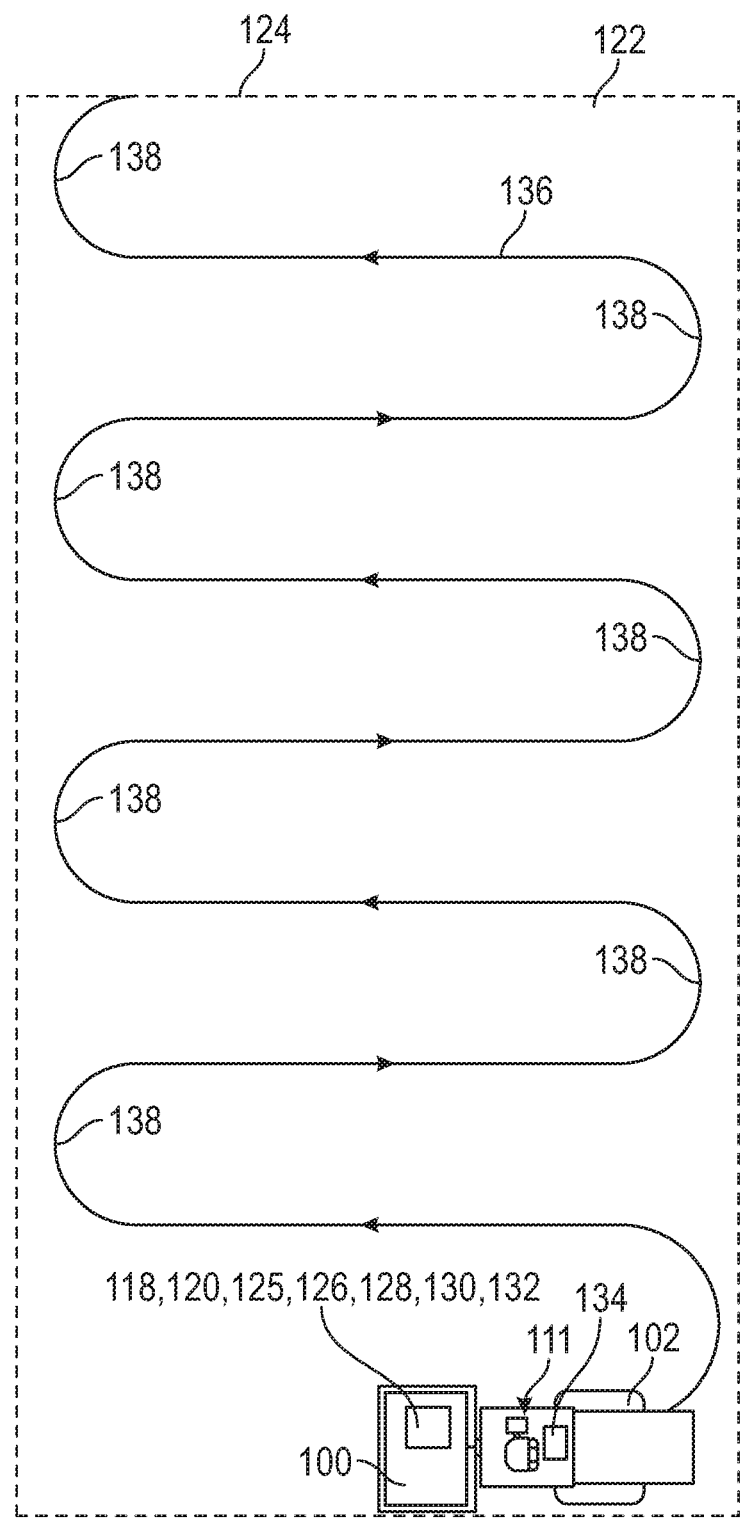
FIG. 2 is a schematic diagram of the compactor of FIG. 1 operating within a compacting area.

As shown now specifically in reference to FIG. 2, one or more sensors 118 can be mounted to the compactor 100, The operational controller 111 can be coupled to the compactor 100 and communicatively coupled to the one or more sensors 118. In some examples, at least one of the one or more sensors 118 can be remote from the compactor 100 such as a camera or other visual detection device placed adjacent the compactor 100 in or adjacent a compacting area 124 (shown schematically by dashed lines) The one or more sensors 118 can be configured to generate data indicative of operational criteria of the compactor 100 and send the data as signals to the operational controller 111, which can be configured to receive such signals/data. The one or more sensors 118 can include a speed sensor 120 configured to measure a speed of the compactor 100 over a surface 122 within the compacting area 124 as further shown in FIG. 2. Further one or more sensors 118 can also be used in some examples. Such further sensors can include, for example, a compaction sensor 125 configured to measure a density and/or modulus of a construction material that forms the surface 122, a temperature sensor 126 configured to measure a temperature of the construction material the forms the surface 122, a slope sensor 128 configured to measure a slope of the surface 122, a moisture sensor 130 configured to sense a moisture content such as of soil within the compacting area 124, and/or a steering sensor 132. According to one example the temperature sensor 126 can be a visual sensor such as an infra-red sensor(s) configured to deliver real-time readings to the operational controller 111 and/or the operator. In some cases, the temperature sensor 126 can comprise two infra-red sensors mounted on the front and rear of the compactor 100. The data from the sensors can provided for temperature mapping, a visual readout of mat temperature in order to keep the compactor 100 in the proper temperature range (e.g., avoid tender-zones that can occur in the range of 104°-110° C. (219°-230° F.) temperature range). The compaction sensor 125 can comprise an accelerometer or another type of sensor that can be used as part of a compaction system as variously described in U.S. Patent Application Serial Nos. US2012/0107045A1 and US20140348587A1, co-owned by the applicant, the entire contents of which are incorporated in their entireties.

The steering sensor 132 can be mounted on the compactor 100 and can be configured to measure steering angle, movement, steering speed, or rate of movement, of the steering wheel (not shown) by the operator. The steering sensor 132 can comprise magnetic reed switch(es), Hall Effect sensor(s), accelerometer(s), and magnetometer, among other example rotary/orientation sensors, for example. The steering sensor 132 can be in electronic communication with the operative controller 111 and can be configured to transmit data to the operative controller 111 indicative of the measured data (e.g., steering angle, movement, steering speed, rate of movement, other data relevant to steering, etc.). Steering speed is the rate at which the steering wheel is turned or moved by the operator in order to turn the drums (only front drum 102 is shown in FIG. 2) of the compactor 100. In an embodiment in which a steering wheel is utilized, the steering speed may be the rate at which the steering wheel is rotated by the operator. In an embodiment with a joystick rather than a steering wheel, the steering speed may be the rate at which a joystick may be pushed or pulled by the operator to turn the drums of the compactor 100 as it moves.

In some examples, the compactor 100 can include an input/display device 134 that can be used to monitor, display and/or input data to the operational controller 111. For example, such data can include data gathered by the one or more sensors 118 regarding operating criteria (e.g., the density and/or modulus of the construction material that forms the surface 122 derived from the compaction sensor 125, the temperature of the construction material the forms the surface 122 derived from the temperature sensor 126, the slope of the surface 122 derived from the slope sensor 128, the moisture content of the soil derived from the moisture sensor 130, etc.). Such data can include further operation related data (factors/criteria) that can be input to the operational controller 111 either manually or automatically. This data can include properties of the material being compacted (e.g., an asphalt type), a mass of the compactor, a type of the compactor and other material properties or physical conditions of the compacting area, etc.

In some examples, the data gathered by the one or more sensors 118, specifically regarding the density and/or modulus, the temperature, the slope, the moisture content and/or the further operation related data (factors/criteria discussed above) can be used by the operational controller 111 to select and/or modify algorithm(s) governing the movement including the turning radii and/or speed of the compactor 100 as further discussed below. For example, on a very steeply sloped compacting area a more conservative (larger) turning radius can be selected and utilized by the operational controller 111 as opposed to a compacting area with the surface 122 having little to no slope. Similarly, if the asphalt is sensed to be relatively hotter (e.g., above 220 Fahrenheit) a more conservative (larger) turning radius can be selected and utilized by the operational controller 111.

FIG. 2 shows an operational path 136 of the compactor 100 within the compacting area 124 on the surface 122. The operational path 136 include a number of turns 138 each having a turning radius as further discussed in reference to FIGS. 3A and 3B.

Figure 3B:
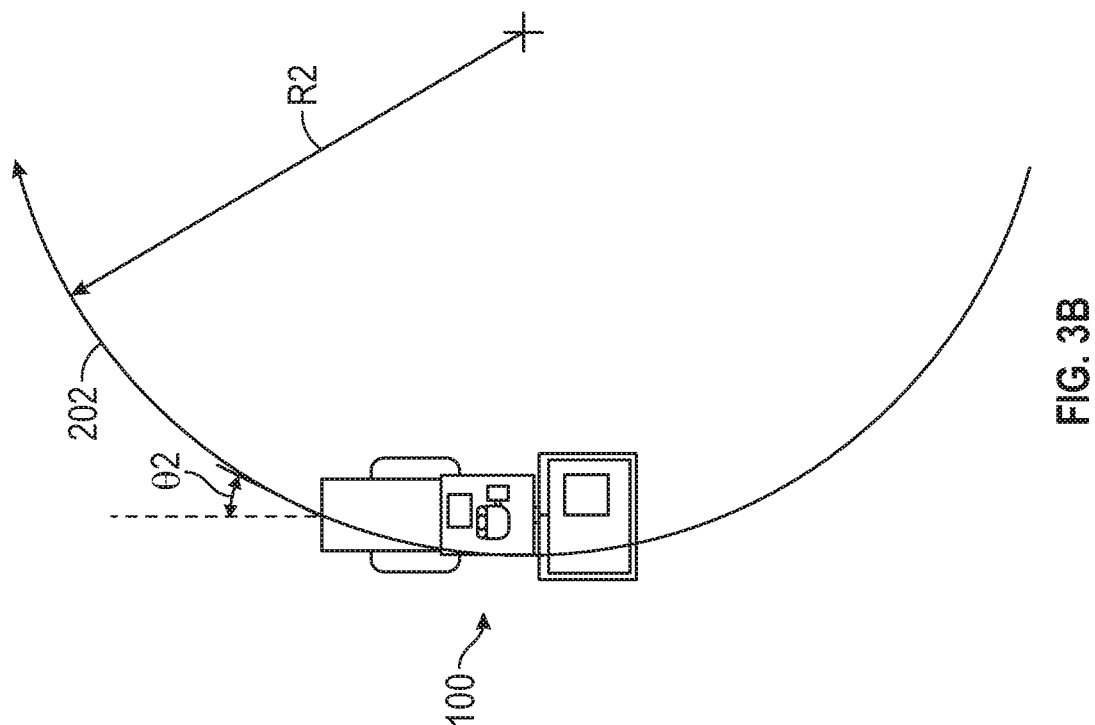
FIGS. 3A and 3B are top plan views of the compactor of FIG. 1 schematically depicting the compactor performing two different turns each having a different turning radius.
Figure 3A:
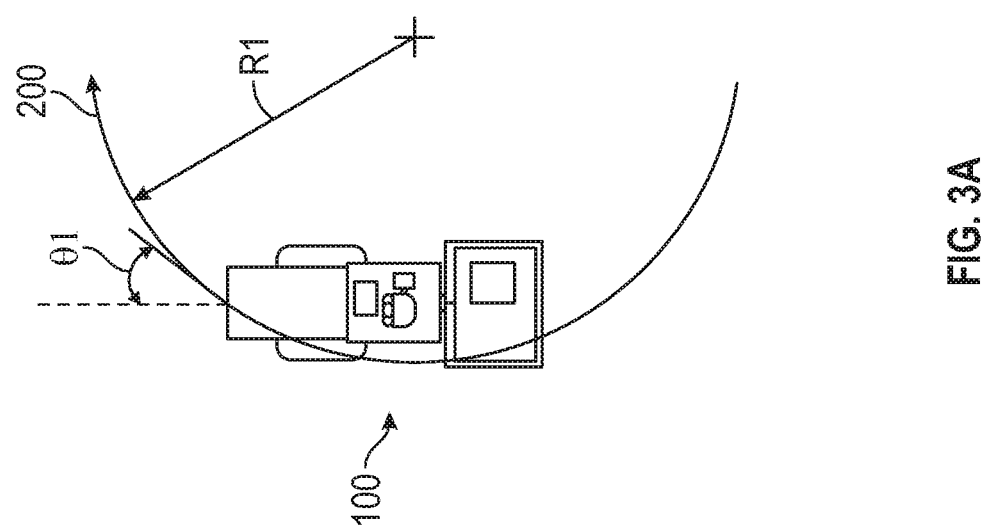

FIGS. 3A and 3B show the compactor 100 performing two different turns each having a different turning radius. FIG. 3A shows a first turn 200 and FIG. 3B shows a second turn 202. In FIG. 3A, the first turn 200 is depicted that is tighter than the second turn 202 of FIG. 3B. Thus, the first turn 200 has a relatively lower turning radius R1 than a turning radius R2 of FIG. 3B, However, the first turn 200 has a larger turning angle θ1 (i.e., having a higher degree) than a turning angle θ2 of FIG. 3B FIG. 3B schematically depicts the compactor performing the second turn 202 that is more gradual having the smaller turning radius R2 than that of FIG. 3A. The second turn 202 has a smaller turning angle θ2 as compared with the turning angle θ1 of FIG. 3A.

Recall that turning overly sharply (i.e. with a steering angle of a high degree resulting in a low turning radius) while traveling at an undesirably fast rate of speed while performing compaction can cause damage to a surface of the material (e.g., soil, asphalt, etc.) being compacted. Thus, in some instances it can be desirable to increase the turning radius (and limit the turning angle) as illustrated in FIG. 3B as opposed to using the turning radius illustrated in FIG. 3A.

Figure 4:
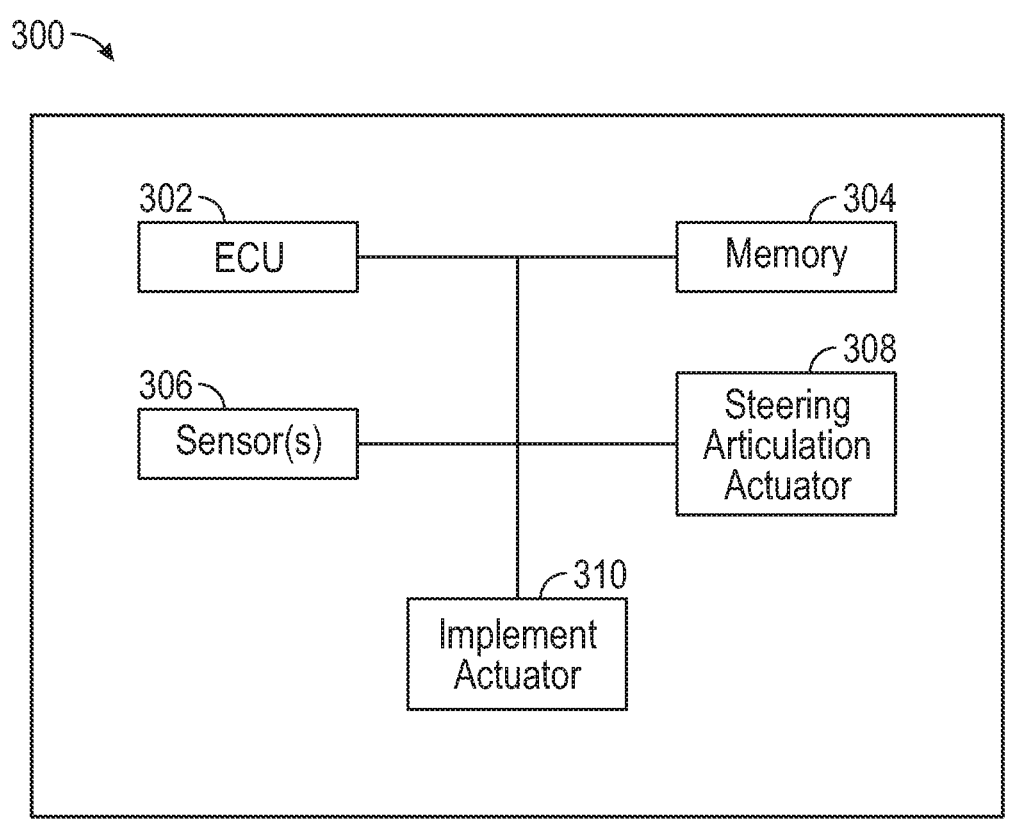
FIG. 4 is a diagram of a system that can be used with the exemplary compactor of FIG. 1 to control the machine movement.

FIG. 4 shows a schematic of a control system 300 that can be utilized with the compactor 100 previously discussed. The control system 300 can include or comprise the operation controller 111 in some examples. The controller 111 can be, as in the example of FIG. 4, an electronic control unit (ECU) 302. In the example of FIG. 4, the ECU 302 can be coupled to the compactor or can be remote therefrom. The control system can include transmitter, receiver, transceiver, and other componentry component (not specifically illustrated) configured to enable ECU 302 to communicate and exchange information, data, signals, as examples, with other systems and/or machines/vehicles.

The control system 300 can be an embedded system that controls machine electrical systems and/or other subsystems of the machine. Types of ECUs include Electronic/engine Control Module, Powertrain Control Module, Transmission Control Module, Brake Control Module, Suspension Control Module, among other examples. In the case of industrial, construction, and other heavy machinery, example ECUs can also include an Implement Control Module associated with one or more implements coupled to and operable from the machine.

The control system 300 and the ECU 302 and other electronic controls of compactor 100, can include software, hardware, and combinations of hardware and software configured to execute a number of functions attributed to the components in the disclosed examples. The ECU 302 or other electronic controls of compactor 100 can be an analog, digital, or combination analog and digital controllers including a number of components. As examples, the ECUs and other electronic controls of compactor 100 can include integrated circuit boards or ICB(s), printed circuit boards PCB(s), processor(s), data storage devices, switches, relays, etc. Examples of processors can include any one or more of a microprocessor, a controller, a digital signal processor (DSP), an application specific integrated circuit (ASIC), a field-programmable gate array (FPGA), or equivalent discrete or integrated logic circuitry.

The control system 300 can include memory 304 (e.g., storage media) to store and/or retrieve data or other information, for example, signals from sensors 306. Examples of non-volatile storage devices include magnetic hard discs, optical discs, floppy discs, flash memories, or forms of electrically programmable memories (EPROM) or electrically erasable and programmable (EEPROM) memories. Examples of volatile storage devices include random access memories (RAM), dynamic random access memories (DRAM), static random access memories (SRAM), and other forms of volatile storage devices. The data storage devices can be used to store program instructions for execution by processor(s) of, for example, ECU 302.

The control system 300 including the components shown in FIG. 4 can be configured to communicate with one another and with other components of compactor 100 via various wired or wireless communications technologies and components using various public and/or proprietary standards and/or protocols. Examples of transport mediums and protocols for electronic communication between components of compactor 100 include Ethernet, Transmission Control Protocol/Internet Protocol (TCP/IP), 802.11 or Bluetooth, or other standard or proprietary transport mediums and communication protocols.

According to the example of FIG. 4, the control system 300 can include an steering articulation actuator 308 configured to execute commands of the implement actuator 310. The implement actuator 310 can communicate with all of the ECU 302, memory 304, one or more sensors 306 and steering articulation actuator 308. The steering articulation actuator 308 can couple with the steering system, the drive system, the braking system as previously described in FIG. 1 to control movement of the compactor. For example, the steering articulation actuator 308 can communicate with the steering control valve of the steering system as previously discussed in reference to FIG. 1. Signals from the control system 300 via the steering articulation actuator 308 can control the steering system to execute turns of having a desired turning radius as is further described herein. Thus, the control system 300 implemented in hardware, software, and combinations thereof, can be configured to automatically control movement (e.g., the turning radius, speed) and/or other aspects of the compactor operation without intervention by or interaction from the operator according to some examples.

The control system 300 can be configured, for example, to automatically control the turning radius of the machine when certain conditions (e.g., a speed within a certain range, a speed within a certain range with a detected asphalt density/modulus and/or temperature, etc.) are detected. As discussed previously, the control system 300 can be configured to communicate with and receive signals, data, or other information from one or more sensors 306 configured to detect, measure, etc. one or conditions of, factors and/or parameters related to machine operation. The control system 300 can, for example, be configured to receive signals from and can be configured to automatically control movement of the machine based upon such one or more sensors 306 (e.g., apply the brake system to slow or stop movement of the machine, actuate the steering system to perform a turn having a desired steering angle, etc.).

The present disclosure recognizes, among other things, that automated machine movement controls, e.g. the same or similar to those discussed above, can be utilized to supplement or limit human operation of the compactor such as in the aspect of making appropriate turns for the compactor (given speed and/or speed and other operating conditions/factors) to better avoid damage to asphalt.

Thus, according to one example of the present application there is disclosed a system that controls movement of the compactor within the compacting area. Broadly the system can include a steering system, a brake system, a drive system and/or a control system (examples previously illustrated and discussed). The system can additionally include the one or more sensors (examples previously illustrated and discussed). The one or more sensors can be configured to generate data indicative of operational criteria of the compactor. The one or more sensors can include a speed sensor configured to measure a speed of the compactor over a surface within the compacting area. The control system/controller can be communicatively coupled to the one or more sensors. The control system/controller can be configured to receive data indicative of the speed of the compactor from the speed sensor, determine if the speed of the compactor exceeds a first threshold speed, and if the speed of the compactor exceeds the first threshold speed, control the steering system to limit a turning angle to a predetermined value such that a turning radius of the compactor is increased.

According to further examples, the control can limit the turning angle of the steering system to the predetermined value if the predetermined value has been exceeded by an operator. The control to the predetermined value can be to a predetermined degree that is based upon the speed of the compactor. The controller/control system can be configured to determine if the speed of the compactor exceeds a second threshold speed, and if the speed of the compactor exceeds the second threshold speed, control the steering system to a second predetermined turning angle such that the turning radius of the compactor is further increased. Indeed, in some examples, the systems/method disclosed herein can have plurality of threshold speeds between the first threshold speed and the second threshold speed. The controller/control system can be configured to determine if the speed of the compactor exceeds any of the plurality of threshold speeds, and if the speed of the compactor exceeds any of the plurality of threshold speeds, control the steering system to one of a plurality of predetermined turning angles based upon the speed. In some examples, the first predetermined turning angle and second predetermined turning angle can be linearly related to one another based upon the speed of the compactor.

As discussed previously, in some examples the one or more sensors further include a steering sensor configured to measure a movement of the steering system within the compacting area. The controller/control system can be configured to receive data indicative of the movement of the steering system from the steering sensor. As discussed, the controller/control system can override such movement of the steering system by the operator. In some examples, the controller/control system can determine if the speed of the compactor exceeds a maximum threshold speed, and if the speed of the compactor exceeds the maximum threshold speed, can limit turning entirely and/or automatically actuate the brake system or throttle the drive system to reduce the speed of the compactor to a reduced speed that allows for turning of the compactor.

According to some examples the one or more sensors can additionally include one or more of a compaction sensor configured to measure the density and/or modulus of the construction material that forms the surface of the compacting area, a temperature sensor configured to measure a temperature of the material that forms the surface of the compacting area, a slope sensor configured to measure a slope of the surface, and a moisture sensor configured to sense a moisture content within the compacting area. The controller/control system can be configured to control the steering system based operational data (either derived from sensors or input from another non-sensor based source). For example, the controller/control system can be configured to control the steering system based one or more of: data regarding properties of the material being compacted derived from at least the compaction sensor, temperature sensor, data regarding the slope of the compacting area derived from the slope sensor, data regarding a mass of the compactor, data regarding a type of the compactor and data regarding material properties or conditions of the compacting area derived from at least the moisture sensor.

Figure 5:
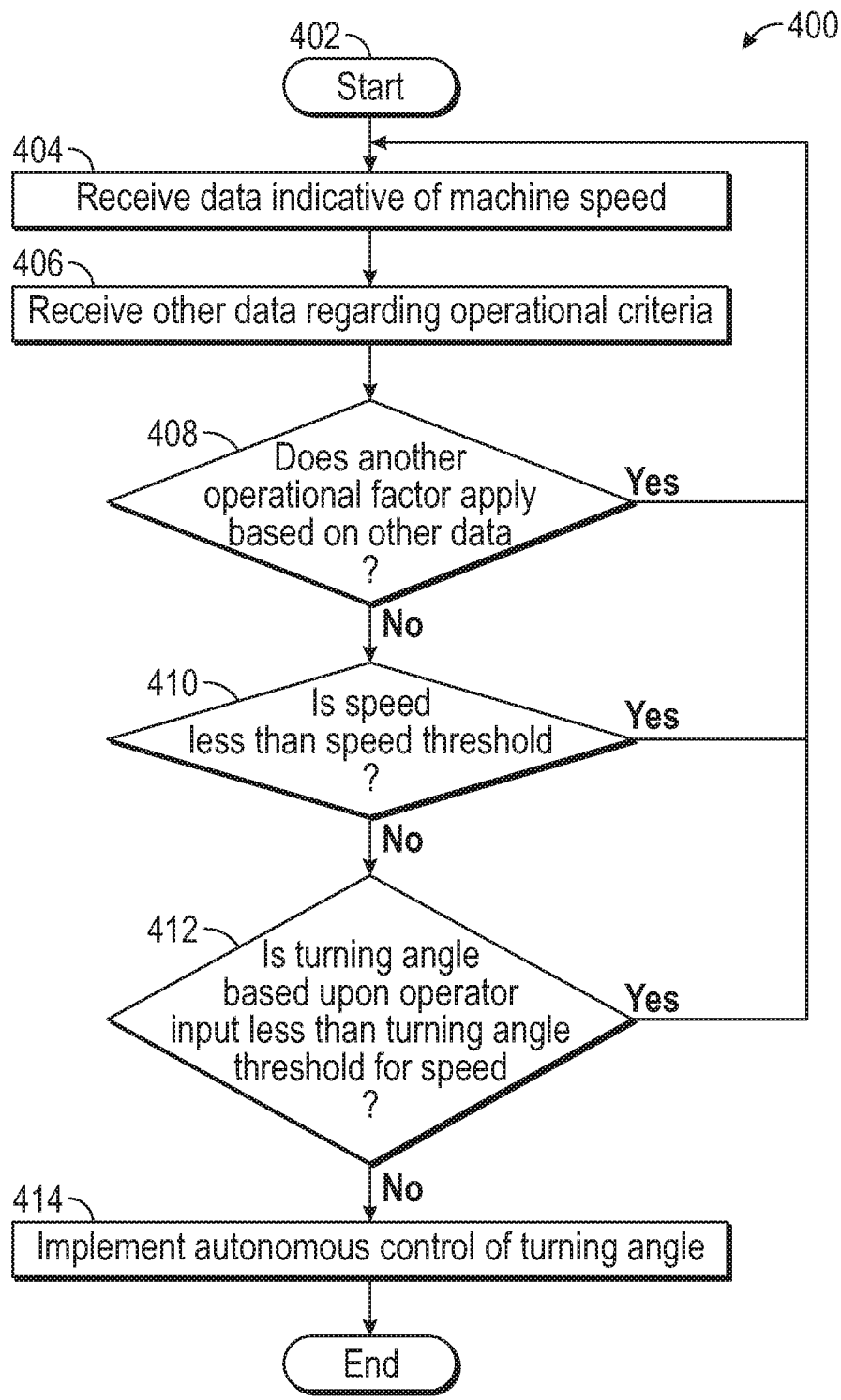
FIG. 5 is a flowchart depicting an example method of operating a compactor in accordance with this disclosure.

FIG. 5 is a flowchart depicting an example method 400 for control of a movement of a compactor within a compacting area in accordance with this disclosure. In FIG. 5, the method 400 includes a start 402 and a step 404 of receiving data indicative of compactor speed from one or more sensors. In the example of FIG. 5, but not in all examples, the method 400 can include a step 406 of receiving other data regarding operational criteria. This other data can be automatically input, manually input, derived from sensor data, etc. as previously discussed. The step 406 can be done contemporaneous with other steps of the method 400, prior to step 404, or may not be performed at all according to some examples. The method 400 proceeds to step 408 where it is determined if another operational factor/criteria should apply based upon the other data. This can act to alter the steering/control algorithms applied in the method 400 and the method 400 would re-start from the start 402 with altered/updated algorithm/logic as indicated. For example, on a very steeply sloped compacting area a more conservative (larger) turning radius can be selected and utilized according to the method 400 as opposed to a compacting area with the surface having little to no slope. Similarly, if the asphalt is sensed to be relatively hotter (e.g., above 220 Fahrenheit as opposed to in the range of about 150 degrees Fahrenheit to 220 degrees Fahrenheit) a more conservative (larger) turning radius can be selected and utilized according to the method 400. It should be noted that in some examples step 408 need bot be performed or can be performed after steps 410 and 412, for example.

The method 400 at step 410, the method 400 can determine if the speed is less than a threshold speed. If it is determined that the speed of the compactor is less than the threshold speed the method 400 can re-start. However, if the speed is determined to exceed the threshold speed at step 410, the method 400 can proceed to the step 412. At step 412, the method 400 can determine if a turning angle of the compactor based upon the operator input is less than a turning angle threshold for the speed of the compactor. If the method 400 determines the operator input for turning angle to be lower than the threshold, the control of method 400 is not implemented in the turn and the method 400 re-starts as shown in FIG. 4. However, if the turning angle of the compactor based upon the operator input is greater than the turning angle threshold, the method 400 can proceed to step 414, where the method 400 can implement an autonomous control of the turning radius to apply a predetermined turning radius (and predetermined turning angle) appropriate to the speed of the compactor.

Thus, the method 400 can include directing the movement the compactor with a steering system as described. The method 400 can include sensing one or more operational criteria of the compactor including a speed of the compactor over a surface within the compacting area. The method 400 can include determining if the speed of the compactor exceeds a threshold speed. The method 400 can include controlling the steering system to limit a turning angle to a predetermined value such that a turning radius of the compactor is increased.

According to further examples, the method 400 can optionally include controlling the steering system to the predetermined value if the predetermined value has been exceeded by an operator. The method 400 can optionally include controlling the steering system to the predetermined value that can be to a predetermined degree that is based upon the speed of the compactor.

INDUSTRIAL APPLICABILITY

The present application discloses compactors that can include controls that are configured to monitor and, in some cases, automatically control various aspects of machine operation including machine movement. In some cases, such compactors can include controls, which, in conjunction with and/or independent of operator control, control aspects of the movement of the machine within the compacting area. Such aspects of machine movement that can be controlled can include but are not limited to machine operating speed in the compacting area and/or machine turning radius within the compacting area. Thus, in the compacting area, machine operating speed can be controlled so as to be limited as further described herein. Additionally, in the compacting area, machine steering angle can be controlled, in some cases based upon the machine operating speed, so as to be limited with the result that a turning radius of the compactor within the compacting area can be increased as further described herein. In this manner, a likelihood of damage to the surface of the material (e.g., soil, asphalt, etc.) being compacted can be reduced or avoided.

In one specific example, a Caterpillar® CB-10 vibratory asphalt compactor having a solid drum and an operating weight of 20945 lb, drum width of 67 inches and drum diameter of 47 inches is disclosed. The CB-10 compactor is capable of a maximum speed of 12 km/h and is capable of a turning radius of 4.25 m at a turning angle of 36 degrees at maximum or other speeds. However, while on hot asphalt having a temperature between 150 degrees Fahrenheit 320 degree Fahrenheit, the turning angle can be limited to 20 degrees when the CB-10 compactor is traveling up to 6 km/h and 10 degrees when the CB-10 is traveling at 12 km/h. The turning angle limit can be relatively linear between 20 degrees and 10 degrees and between 6 km/h and 12 km/h. Thus, the turning angle limit would be about 15 degrees at a speed of 9 km/h, for example. It is important to note that although the CB-10 would otherwise be capable with operator input to have the turning angle of 36 degrees if the disclosed systems, methods and techniques were not applied, with such systems, methods and techniques in place the operator would not be allowed to apply such turning angle on hot asphalt and at the speed ranges provided. Rather, the turning angle would be automatically limited to the values provided in the example above for the CB-10.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A system for control of a movement of a compactor within a compacting area, the system comprising:
   a steering system configured to direct the movement of the compactor including to have a turning angle corresponding to a turning radius of the compactor;
   a brake system;
   a drive system;
   one or more sensors configured to generate data indicative of operational criteria of the compactor, the one or more sensors including a speed sensor configured to measure a speed of the compactor over a surface within the compacting area and a slope sensor configured to measure a slope of the surface of the compacting area; and
   a controller communicatively coupled to the one or more sensors, the controller configured to:
   receive data indicative of the speed of the compactor from the speed sensor,
   receive data indicative of the slope of the surface of the compacting area derived from the slope sensor,
   determine if the speed of the compactor exceeds a first threshold speed and if the slope exceeds or comprises a zero slope, and
   if the speed of the compactor exceeds the first threshold speed and if the slope comprises the zero slope, control the steering system to limit the turning angle of the compactor to a first predetermined turning angle.

2. The system of claim 1, wherein the first predetermined turning angle cannot be exceeded by an operator.

3. The system of claim 1, wherein the controller is configured to:
   determine if the speed of the compactor exceeds a second threshold speed, and
   if the speed of the compactor exceeds the second threshold speed, control the steering system to limit the turning angle of the compactor to a second predetermined turning angle such that the turning radius of the compactor is further increased relative to the turning radius of the compactor if the speed of the compactor exceeds the first threshold speed.

4. The system of claim 3, wherein the controller is configured to:
   generate a plurality of threshold speeds between the first threshold speed and the second threshold speed;
   determine if the speed of the compactor is between the first threshold speed and the second threshold speed; and
   if the speed of the compactor exceeds any of the plurality of threshold speeds, control the steering system to limit the turning angle of the compactor to one of a plurality of predetermined turning angles based upon the speed.

5. The system of claim 3, wherein the second predetermined turning angle is decreased linearly relative to the first predetermined turning angle based upon the speed of the compactor.

6. The system of claim 1, wherein the one or more sensors further include a steering sensor configured to measure a movement of the steering system within the compacting area.

7. The system of claim 6, wherein the controller is configured to receive data indicative of a desired turning angle applied by an operator to the steering system from the steering sensor, and wherein the controller overrides such desired turning angle applied by the operator to the steering system such that the first predetermined turning angle cannot be exceeded by the operator.

8. The system of claim 1, wherein the controller is configured to:
   determine if the speed of the compactor exceeds a maximum threshold speed, and
   if the speed of the compactor exceeds the maximum threshold speed, limit turning entirely and/or automatically actuate the brake system or throttle the drive system to reduce the speed of the compactor to a reduced speed that allows for turning of the compactor.

9. The system of claim 1, wherein the one or more sensors further include one or more of a compaction sensor configured to measure a density and/or modulus of a construction material that forms the surface, a temperature sensor configured to measure a temperature of the construction material that forms the surface, and a moisture sensor configured to sense a moisture content within the compacting area.

10. The system of claim 9, wherein the controller is configured to control the steering system to limit the turning angle of the compactor based upon one or more of: data regarding properties of the material being compacted derived from at least one of the compaction sensor and the temperature sensor, data regarding a mass of the compactor, data regarding a type of the compactor and data regarding material properties or conditions of the compacting area derived from at least the moisture sensor.

11. A compactor comprising:
   a steering system configured to direct the movement of the compactor including to have a turning angle corresponding to a turning radius of the compactor;
   one or more sensors on the compactor configured to generate data indicative of operational criteria of the compactor, the one or more sensors including a speed sensor configured to measure a speed of the compactor over a surface within the compacting area; and
   a controller coupled to the compactor and communicatively coupled to the one or more sensors, the controller configured to:
   receive data indicative of the speed of the compactor from the speed sensor,
   determine if the speed of the compactor exceeds a first threshold speed, and
   if the speed of the compactor exceeds the first threshold speed, control the steering system to limit the turning angle of the compactor to a first predetermined turning angle, wherein the first predetermined turning angle cannot be exceeded by an operator;
   determine if the speed of the compactor exceeds a second threshold speed,
   if the speed of the compactor exceeds the second threshold speed, control the steering system to limit the turning angle of the compactor to a second predetermined turning angle that is less than the first predetermined turning angle such that the turning radius of the compactor is further increased relative to the turning radius of the compactor if the speed of the compactor exceeds the first threshold speed, wherein the second predetermined turning angle cannot be exceeded by the operator;
   generate a plurality of threshold speeds between the first threshold speed and the second threshold speed;
   determine if the speed of the compactor is between the first threshold speed and the second threshold speed; and
   if the speed of the compactor exceeds any of the plurality of threshold speeds, control the steering system to limit the turning angle of the compactor to one of a plurality of predetermined turning angles according to the speed and according to a relationship that the plurality of predetermined turning angles decrease linearly between the first predetermined turning angle and the second predetermined turning angle.

12. A method for control of a movement of a compactor within a compacting area, the method comprising:
   directing the movement the compactor with a steering system;
   sensing one or more operational criteria of the compactor including a speed of the compactor over a surface within the compacting area and a slope of the surface of the compacting area;
   determining if the speed of the compactor exceeds a threshold speed and if the slope of exceeds or comprises a zero slope; and
   controlling the steering system to limit a turning angle to a first predetermined turning angle if the speed of the compactor exceeds the threshold speed and the slope comprises the zero slope.

13. The method of claim 12, wherein the first predetermined turning angle cannot be exceeded by an operator.

14. The system of claim 1, wherein the controller is configured to:
   if the slope of the surface of the compacting area exceeds the zero slope, control the steering system to limit the turning angle of the compactor to a second predetermined turning angle that is smaller than the first predetermined turning angle.

15. The system of claim 1, wherein the controller is configured to restrict the turning angle for the compactor if the slope of the surface of the compacting area exceeds the zero slope.

16. The method of claim 12, further comprising, if the slope of the surface of the compacting area exceeds the zero slope, controlling the steering system to limit the turning angle of the compactor to a second predetermined turning angle that is smaller than the first predetermined turning angle.

17. The method of claim 12, further comprising restricting the turning angle for the compactor if the slope of the surface of the compacting area exceeds the zero slope.

* * * * *